United States Patent
Kamens

(10) Patent No.: US 12,041,025 B2
(45) Date of Patent: *Jul. 16, 2024

(54) SYSTEMS, METHODS, AND COMPUTER PROGRAM PRODUCTS FOR INTER-MODAL PROCESSING AND MESSAGING COMMUNICATION RESPONSIVE TO ELECTRONIC MAIL

(71) Applicant: Open Text Holdings, Inc., Menlo Park, CA (US)

(72) Inventor: Samuel N. Kamens, West Orange, NJ (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,126

(22) Filed: Apr. 24, 2023

(65) Prior Publication Data
US 2023/0262019 A1 Aug. 17, 2023

Related U.S. Application Data

(63) Continuation of application No. 17/509,342, filed on Oct. 25, 2021, now Pat. No. 11,671,398, which is a
(Continued)

(51) Int. Cl.
*H04L 51/56* (2022.01)
*H04L 51/04* (2022.01)
(Continued)

(52) U.S. Cl.
CPC ............. *H04L 51/56* (2022.05); *H04L 51/04* (2013.01); *H04L 51/066* (2013.01); *H04W 4/14* (2013.01);
(Continued)

(58) Field of Classification Search
CPC ....... H04L 51/56; H04L 51/04; H04L 51/066; H04L 51/58; H04L 51/08; H04L 51/52;
(Continued)

(56) References Cited

U.S. PATENT DOCUMENTS

| | | | | |
|---|---|---|---|---|
| 2007/0149223 A1* | 6/2007 | Liang | ................. | H04W 88/184 709/206 |
| 2008/0278740 A1* | 11/2008 | Bird | ..................... | H04L 67/565 358/1.15 |

(Continued)

*Primary Examiner* — Jungwon Chang
(74) *Attorney, Agent, or Firm* — Sprinkle IP Law Group

(57) ABSTRACT

Inter-modal messaging communication is described. In one embodiment, a method of communication includes receiving an electronic mail message to be distributed and determining whether the electronic mail message is a multi-modal distribution message. Respective portions of the message may be separated for each mode of distribution. The separated portions may represent portions to be delivered by SMS messaging and facsimile, for example. The method further includes the steps of transmitting a short message comprising the short message portion of the mail message and establishing a conversation comprising conversation attributes. The conversation attributes are referenced, in certain aspects, to maintain a conversation between an originator of the received electronic mail message and a distribution address of short message portion of the mail message. For example, upon receipt of a short message in reply, the short message may be forwarded to an originator of the conversation.

20 Claims, 8 Drawing Sheets

Related U.S. Application Data continuation of application No. 16/735,216, filed on Jan. 6, 2020, now Pat. No. 11,159,477, which is a continuation of application No. 15/845,368, filed on Dec. 18, 2017, now Pat. No. 10,547,584, which is a continuation of application No. 15/094,302, filed on Apr. 8, 2016, now Pat. No. 9,866,517, which is a continuation of application No. 13/555,544, filed on Jul. 23, 2012, now Pat. No. 9,338,108.

(51) Int. Cl.
| | | |
|---|---|---|
| *H04L 51/066* | (2022.01) | |
| *H04W 4/14* | (2009.01) | |
| *H04L 51/08* | (2022.01) | |
| *H04L 51/214* | (2022.01) | |
| *H04L 51/52* | (2022.01) | |
| *H04L 51/58* | (2022.01) | |
| *H04M 1/72436* | (2021.01) | |
| *H04N 1/00* | (2006.01) | |

(52) U.S. Cl.
CPC ............ *H04L 51/08* (2013.01); *H04L 51/214* (2022.05); *H04L 51/52* (2022.05); *H04L 51/58* (2022.05); *H04M 1/72436* (2021.01); *H04N 1/00209* (2013.01); *H04N 1/00212* (2013.01); *H04N 1/0022* (2013.01)

(58) Field of Classification Search
CPC ........ H04L 51/214; H04W 4/50; H04W 4/14; H04N 1/00209; H04N 1/0022; H04N 1/00212; H04M 1/72436
See application file for complete search history.

(56) References Cited

U.S. PATENT DOCUMENTS

| | | | | |
|---|---|---|---|---|
| 2009/0063232 A1* | 3/2009 | Lissack | ............. | G06Q 10/1095 |
| | | | | 705/7.19 |
| 2009/0292777 A1* | 11/2009 | Jackson | ................. | H04L 67/02 |
| | | | | 709/206 |
| 2012/0239754 A1* | 9/2012 | Vuong | .................... | H04W 4/50 |
| | | | | 709/206 |
| 2012/0293836 A1* | 11/2012 | Hiraike | ............. | H04N 1/00915 |
| | | | | 358/1.15 |

* cited by examiner

SYSTEMS, METHODS, AND COMPUTER PROGRAM PRODUCTS FOR INTER-MODAL PROCESSING AND MESSAGING COMMUNICATION RESPONSIVE TO ELECTRONIC MAIL

CROSS-REFERENCE TO RELATED APPLICATIONS

This application is a continuation of, and claims a benefit of priority under 35 U.S.C. § 120 from, U.S. patent application Ser. No. 17/509,342, filed Oct. 25, 2021, issued as U.S. Pat. No. 11,671,398, entitled "SYSTEMS, METHODS, AND COMPUTER PROGRAM PRODUCTS FOR INTER-MODAL PROCESSING AND MESSAGING COMMUNICATION RESPONSIVE TO ELECTRONIC MAIL," which is a continuation of, and claims a benefit of priority under 35 U.S.C. § 120 from, U.S. patent application Ser. No. 16/735,216, filed Jan. 6, 2020, issued as U.S. Pat. No. 11,159,447, entitled "SYSTEMS, METHODS, AND COMPUTER PROGRAM PRODUCTS FOR INTER-MODAL PROCESSING AND MESSAGING COMMUNICATION RESPONSIVE TO ELECTRONIC MAIL," which is a continuation of, and claims a benefit of priority under 35 U.S.C. § 120 from, U.S. patent application Ser. No. 15/845,368, filed Dec. 18, 2017, issued as U.S. Pat. No. 10,547,584, entitled "SYSTEMS, METHODS, AND COMPUTER PROGRAM PRODUCTS FOR INTER-MODAL PROCESSING AND MESSAGING COMMUNICATION RESPONSIVE TO ELECTRONIC MAIL," which is a continuation of, and claims a benefit of priority under 35 U.S.C. § 120 from, U.S. patent application Ser. No. 15/094,302, issued as U.S. Pat. No. 9,866,517, filed Apr. 8, 2016, entitled "INTER-MODAL MESSAGING COMMUNICATION," which is a continuation of, and claims a benefit of priority under 35 U.S.C. § 120 from, U.S. patent application Ser. No. 13/555,544, filed Jul. 23, 2012, issued as U.S. Pat. No. 9,338,108, entitled "INTER-MODAL MESSAGING COMMUNICATION." All applications referenced in this paragraph are hereby fully incorporated by reference herein for all purposes.

BACKGROUND

With the increased use and adoption of cellular phones, communication by short message service (SMS) has increased dramatically. SMS is a text messaging service typically used for short message communication between cellular or mobile telephones. SMS messages allow the exchange of electronic messages of a predetermined number of characters between mobile telephones, even across different cellular carriers. Because of the simple and expedient nature of SMS messaging, it has become a widely-adopted communication option.

Users still rely upon other types of communication, however, such as e-mail. In certain aspects, communication by SMS messages is more difficult than e-mail because most mobile devices lack the full QWERTY keyboard of a desktop computer, for example. Still, because users typically carry their mobile devices with them, communication by SMS messages is usually available, even when communication by e-mail is not. Also, the likelihood of reaching a person by SMS message is generally considered to be higher than the likelihood of reaching the person by e-mail, especially if speed is an important factor, because users often carry mobile devices.

An outgoing SMS message is generally addressed to a telephone number of a mobile telephone. Along the same lines, an outgoing e-mail message is generally addressed to an e-mail address of an e-mail account. Because of network, protocol, and addressing differences, among other differences, communication between SMS messaging and e-mail is not generally available. That is, a user cannot draft an e-mail as an SMS message and deliver the message to a user of a mobile device such as a smart phone. Also, a user of a mobile device cannot draft an SMS message as an e-mail and deliver the message to a user of a computer. Similarly, communication between e-mail and facsimile is not generally available, for example, without specialized systems for interfacing.

In this context, it would be advantageous to have the ability to address an outgoing e-mail message to an SMS recipient. Also, it would be advantageous to have the ability to maintain a conversation between an e-mail account and mobile device, interfacing the e-mail account with the SMS service of the mobile device.

SUMMARY

In one embodiment, a method of inter-modal messaging communication is described. The method includes receiving an electronic mail message to be distributed to at least one destination address. In certain embodiments, the method includes determining whether the electronic mail message is a multi-modal distribution message based on the at least one destination address and, when determining that the electronic mail message is a multi-modal distribution message, separating respective portions of the message for each mode of distribution based on one or more indicators or formatting attributes of the message. The separated portions may represent portions to be delivered by SMS messaging and facsimile, for example. For a short message portion, the method may further include parsing the short message portion into a number of individual short messages. The number of short messages may be determined according to a messaging parameter value and a predetermined short message size. In certain embodiments, the messaging parameter value is user-determined to reduce an overall number of short messages that are transmitted, as a cost limiting measure. The method further includes the steps of transmitting a short message comprising the short message portion of the mail message and establishing a conversation comprising conversation attributes.

In certain aspects, when transmitting the short message portion of the mail message, the method further includes updating the conversation attributes with an identifier of an originator of the short message, a recipient address of the short message, a short code for the conversation, a start time for the conversation, and an end time for the conversation. The conversation attributes are referenced, in certain aspects, to maintain a conversation between an originator of the received electronic mail message and a distribution address of short message portion of the mail message.

In certain embodiments, short codes are used to deliver short messages. In this context, the method may further include determining whether a destination address of a short message portion matches an available code in a short code pool table. Also, because conversations are maintained between e-mail and short message services in certain aspects and embodiments described herein, the method may further include determining whether a conversation was previously established between the originator of a received mail message and a destination address of a short message portion to be delivered. In response to determining that no conversation was previously established, the method may further include identifying and returning a new short code for the conversation. Alternatively, in response to determining that a conversation was previously established, the method may further include identifying and returning an established short code for the conversation.

In other aspects, the method may further include receiving a short message and short messaging address from a messaging device. After receiving the short message, established conversations may be searched to identify whether the short messaging address is attributed to a previously established and maintained conversation. When the address of the short message is attributed to a previously established conversation, the method may further include forwarding the short message to an originator of the previously established conversation. In this manner a conversation can be maintained between different modes of communication. For example, a conversation can be maintained between a user of a computer and a user of a mobile device, by communicating e-mail and SMS messages between them.

In another embodiment, a system of inter-modal messaging communication is described including a communications network and a gateway computer. In certain aspects, the computer is configured to receive an electronic mail message to be distributed and determine whether the electronic mail message is a multi-modal distribution message. In other aspects, the computer is further configured to separate respective portions of the message for each mode of distribution when determining that the electronic mail message is a multi-modal distribution message. The separated portions may represent portions to be delivered by SMS messaging and facsimile, for example. Further, based on a short message conversation parameter, the computer may be configured to transmit a short message comprising the short message portion of the mail message and establish a conversation comprising conversation attributes.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the invention and the advantages thereof, reference is now made to the following description, in conjunction with the accompanying figures briefly described as follows.

DETAILED DESCRIPTION

In the following paragraphs, embodiments are described in further detail by way of example with reference to the attached drawings. In the description, well known components, methods, and/or processing techniques are omitted or briefly described so as not to obscure certain aspects of the various embodiments. Among the embodiments, some aspects and features are implemented by a computer program executed by one or more processors, as described and illustrated. As would be apparent to one having ordinary skill in the art, the embodiments described herein may be implemented, at least in part, by computer-readable instructions in various forms, and the various embodiments are not intended to be limiting to a particular set or sequence of instructions executed by the processor.

The embodiments described herein are directed to inter-modal messaging communication.

As noted above, while both e-mail and SMS messaging are well known and widely used means of electronic communication, they are generally used independently or exclusively of each other.

Thus, a conventional e-mail server will not be able to deliver an e-mail addressed to a mobile telephone number. Similarly, a conventional SMS message server will not be able to deliver an SMS message addressed to an e-mail address. The embodiments described herein provide devices, systems, and methods for inter-modal messaging communication between e-mail, facsimile, and SMS messages.

Turning now to the drawings, in which like numerals indicate like elements throughout, embodiments of the invention are described in further detail.

Figure 1:
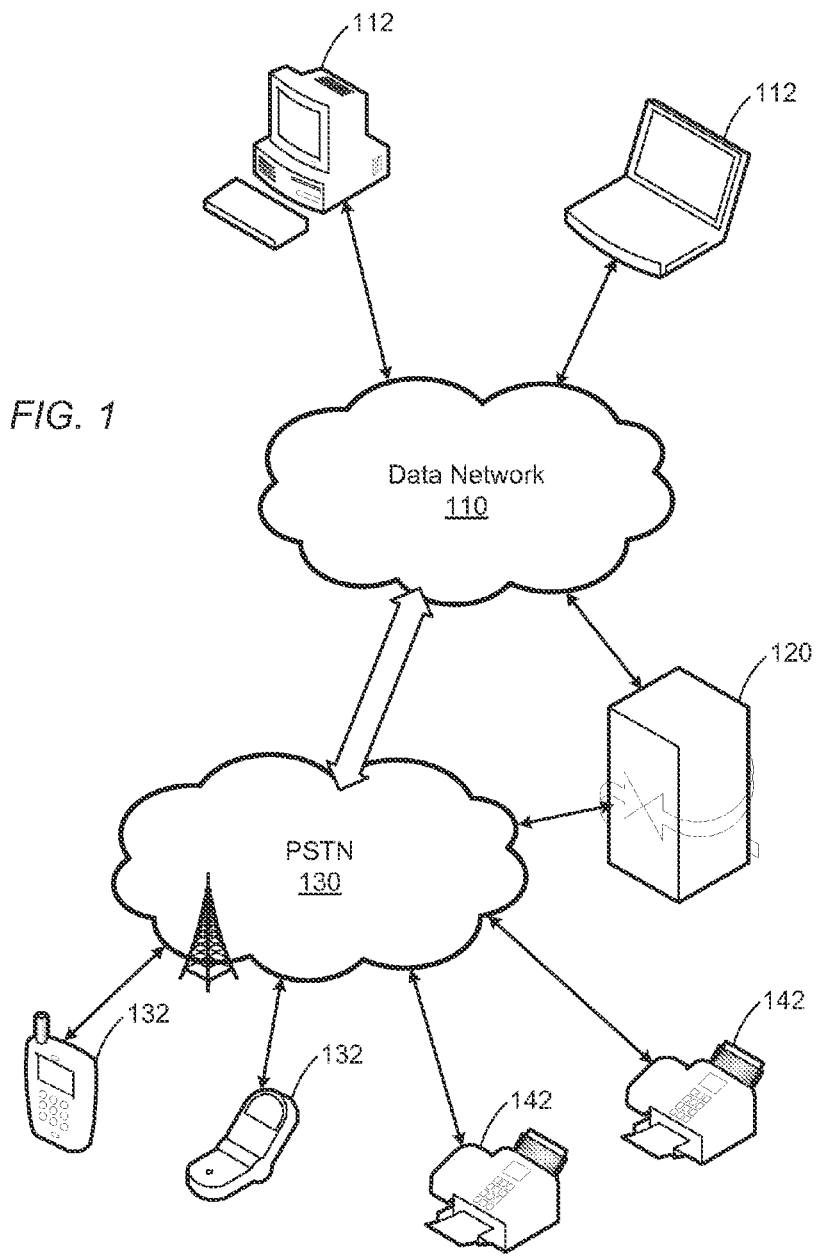
FIG. 1 illustrates an example system network diagram according to one embodiment described herein.

FIG. 1 illustrates an example system network diagram according to one embodiment. The network includes data network 110 and the PSTN 130. The data network 110 may comprise a public, private, or public and private packet-switched data network, including one or more Local Area Networks (LANs), Wide Area Network (WANs), and the Internet. The PSTN 130 may comprise a public, private, or public and private circuit-switched telephone network.

In the example of FIG. 1, several clients or terminals, such as computers 112, are communicatively coupled to the data network 110. Each computer 112 may be coupled to the data network 110 in any manner understood by those of ordinary skill in the art. For example, connections between the computers 112 and the data network 110 may be via intermediary networks and/or Internet Service Providers (ISPs). The data network 110 and any connections to the data network 110 may also include one or more wired, wireless, or optical connections, among other well-known connections. Among various embodiments, the computers 112 comprise computers configured to execute application programs such as e-mail clients, web-browsers, and standard document editing and preparation applications. The computers 112 execute computer-readable instructions stored on one or more computer-readable storage mediums as understood in the art and it is noted that the computers 112 are not limited to desktop, laptop, or any particular type of computer. The computers 112 may comprise any suitable computing device.

As further discussed below, the computers 112 are configured to transmit electronic messages including one or more destination addresses associated with different modes of communication (i.e., multi-modal distribution messages). For example, in one embodiment, the computers 112 are configured to compose and transmit electronic mail (i.e., e-mail) messages addressed to a mobile device or telephone, addressed according to a format such as <1234567890@mail2sms.com>, and to a fax machine, addressed according to a format such as <1234567891@mail2fax.com>. For example, the computers 112 are configured to send a single e-mail message addressed to both <1234567890@mail2sms.com> and <1234567891@mail2fax.com>. In certain aspects further discussed below, the computers 112 are configured with special software templates, form libraries, and/or applications to assist with drafting multi-modal distribution messages.

In the example of FIG. 1, several mobile devices 132 are connected to the PSTN 130. In certain embodiments, the mobile devices 132 include the necessary hardware and software to communicate by SMS messaging. As such, the mobile devices 132 are configured to send and receive SMS messages between each other and to and from other devices capable of communicating by SMS messaging. It is noted that, in various embodiments, the mobile devices 132 include any device such as standard mobile phones, mobile smart phones, and tablet devices, among other devices. Among embodiments, the mobile devices 132 may be communicatively coupled to the PSTN 130 via wireless cellular networks that support wireless communications features such as SMS messaging, as understood in the art. As described herein, the PSTN 130 includes both the standard public switched telephone network (i.e., the landline network) as well as the digital cellular networks relied upon for wireless cellular communications. It is noted that cellular networks are generally independent from the PSTN in many aspects, although being corr1n1unicatively coupled together for wireless cellular phones with landline phones. It is also noted that SMS messaging between two cellular devices does not rely upon the standard public switched telephone network, because it is handled only by the digital networks of cellular service providers. The mobile devices 132 may also include the necessary hardware and software to be communicatively coupled to the data network 110 via wireless networks such as Wi-Fi (i.e., 802.11 and similar) networks.

In certain embodiments, as illustrated in FIG. 1, fax machines 142 are communicatively coupled to the PSTN 130. In other embodiments, one or more fax machines similar to the fax machines 142 may be coupled to the data network 110. In various embodiments, the fax machines 142 rely upon any known standard fax protocol for transmission of faxes over the PSTN 130 and/or the data network 110. As understood in the art, the fax machines 142 scan documents to electronic images, transmit and receive those electronic images over the PSTN 130 and/or the data network 110, and reproduce the electronic images to hardcopy (i.e., paper) form.

The server 120 comprises an inter-modal messaging communications server. The server 120 is communicatively coupled to the data network 110 and the PSTN 130. The server 120 may be communicatively coupled to the data network 110 via intermediary networks and/or Internet Service Providers (ISPs), as understood in the art. In various embodiments, the server 120 is configured to receive, from the computers 112, an electronic message to be distributed to one or more destination addresses. In certain exemplary embodiments, the electronic messages received by the server 120 from the computers 112 comprise electronic mail (i.e., e-mail) messages. The destination addresses may include several destination addresses associated with different modes of communication. For example, the destination addresses may include fax numbers and mobile telephone numbers. In this context, for example, the server 120 may receive an e-mail addressed for distribution to both a mobile telephone number and a fax number. As another example, when one of the computers 112 transmits an e-mail addressed to both <1234567890@mail2sms.com> and <1234567891@mail2fax.com>, the server 120 may receive respective e-mail messages based on the separate "mail2sms.com" and "mail2fax.com" mailbox domain names.

In other aspects, the server 120 is configured to determine whether an e-mail message received from one of the computers 112 is a multi-modal distribution message. When determining that the e-mail message is a multi-modal distribution message, the server 120 is further configured to separate respective portions of the e-mail message for each mode of distribution based on one or more indicators or formatting attributes in the message, as discussed in further detail below. For example, the server 120 may separate the e-mail message into a short message portion for communication by SMS messaging and a fax message portion for communication by fax. In certain embodiments and aspects, the server 120 is further configured to parse the short message portion into a number of individual short messages according to, at least, a messaging parameter value and a predetermined short message size. In other aspects, the server 120 is further configured to transmit a short message including the short message portion of the mail message and establish a conversation in association with the short message. In various embodiments, the server 120 may comprise one computer or computing device or a combination of more than one computer or computing device. Additional details regarding the elements and functions of the server 120 are described with reference to FIG. 2 below.

Figure 2:
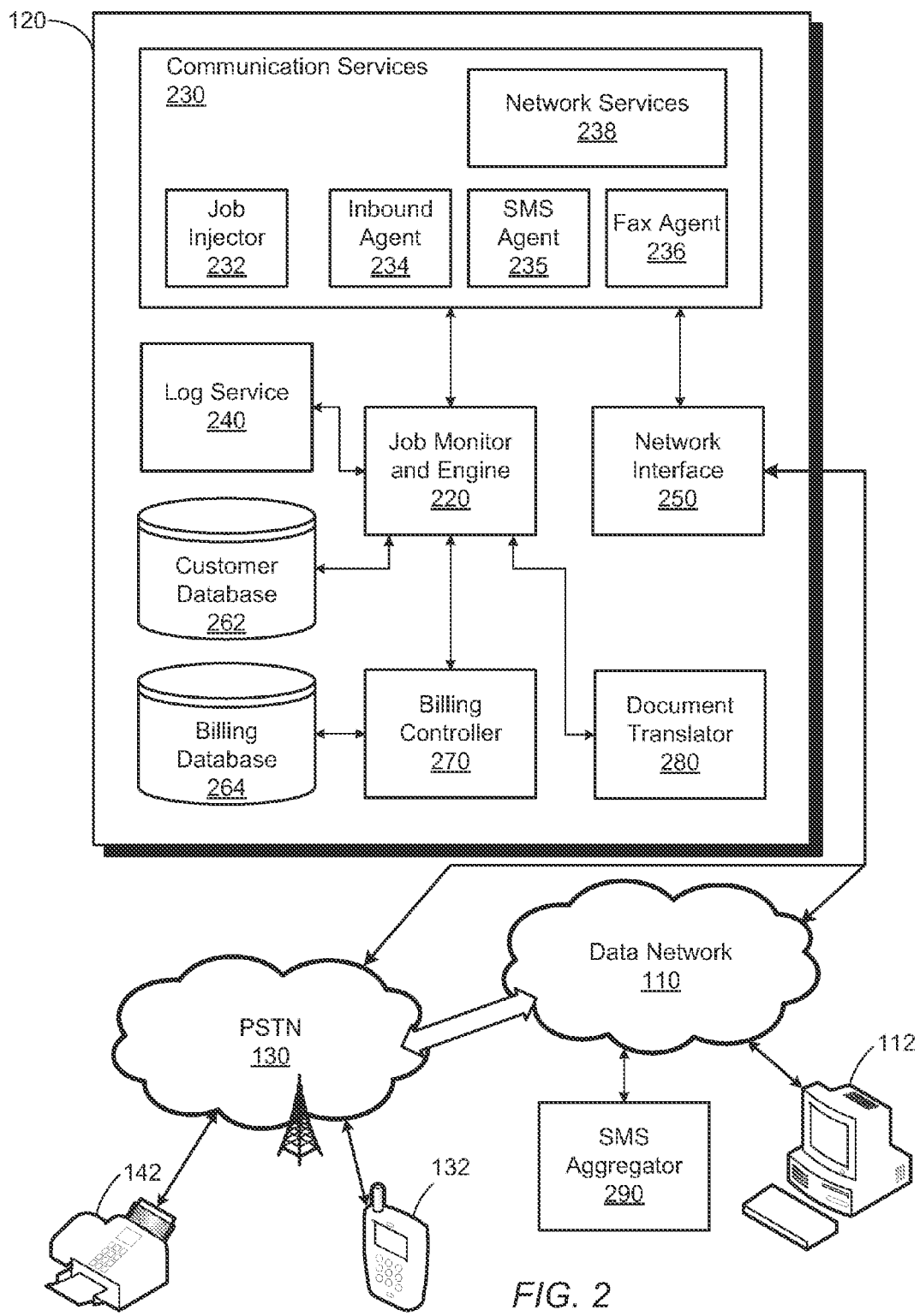
FIG. 2 illustrates an example embodiment of elements of an inter-modal messaging communications server.

Turning to FIG. 2, an example embodiment of elements of the inter-modal messaging communications server 120 is illustrated. As discussed above, the server 120 comprises an inter-modal messaging communications server. As illustrated, the server 120 includes a job monitor and engine 220, communications services 230, log services 240, a network interface 250, a customer database 262, a billing database 264, a billing controller 270, and a document translator 280. The communications services 230 include network services 238, a job injector 232, an inbound agent 234, an SMS agent 235, and a fax agent 236.

In certain aspects, the elements and functions of the server 120 are coordinated by the job monitor and engine 220 to facilitate an inter-modal messaging service. The inter-modal messaging service permits users to send and receive inter-modal messages between the computers 112, the mobile devices 132, and the fax machines 142. In other words, for example, the inter-modal messaging service includes inter-modal communications such as e-mail to SMS messaging communications, e-mail to fax communications, SMS messaging to e-mail communications, and fax to e-mail communications. Thus, in certain aspects, the server 120 serves as an e-mail to SMS, SMS to e-mail, e-mail to fax, and fax to e-mail gateway.

Generally, the inbound and outbound communications of the inter-modal messaging service are performed by one or more elements of the communication services 230. For example, e-mail and SMS messages are received by the inbound agent 234. Further, outbound SMS messages are transmitted by the SMS agent 235, outbound fax messages are transmitted by the fax agent 236, and jobs of the inter-modal messaging service are injected by the job injector 232 for monitoring and processing by the job monitor and engine 220. In connection with the receipt of an inbound e-mail message and the distribution of that message by SMS and fax, for example, the inbound agent 234 is configured to coordinate with the job injector 232 to inject jobs for monitoring and processing by the job monitor and engine 220.

Additionally, in connection with the network services 238, the server 120 provides access to the inter-modal messaging services provided by the server 120 and a log of details surrounding the services performed or completed by the server 120, for each respective user or user account subscribing to the service. In one embodiment, the network services 238 includes a web host, and details surrounding the inter-modal communication services performed by the server 120 are logged as entries in one or more web pages accessible to subscribers of the service. Additionally, in connection with the web host of the network services 238, a user of one of the computers 112 may navigate to and access a web page associated with the inter-modal messaging communications service of the server 120 using a web browser. Access to the web page may be dependent upon entering a secure username and password, for example, as understood in the art, and validation by the server 120 that the user is a subscribing customer in good standing with reference to the customer and billing databases 262 and 264. Upon access to the web page, a user of the computer 112 may draft an e-mail including an electronic document attachment for delivery by the server 120 using SMS messaging and/or fax communications.

The web host may also serve one or more web pages that illustrate a history of SMS messages and faxes sent and received by the server 120 in connection with a user's account. The examples of the web-based remote access and control of the server 120 described above are not intended to be limiting in nature, and other web-based remote access and control of the server 120 consistent with this disclosure is within the scope and spirit of the embodiments described herein.

The log service 240 maintains a log of all processes performed by the inter-modal messaging service by the server 120. For example, the log service 240 maintains a log of incoming and outgoing e-mail, SMS messages, faxes, and related data for purposes of maintaining records and generating billing invoices. In other words, the log service 240 is configured to maintain a log of the actions undertaken by the server 120 in connection with the inter-modal messaging service for future reference. In certain aspects and embodiments, the log service 240 maintains a log that is separated or may be queried by user account.

The document translator 280 is configured to translate formats of electronic documents, as received by the server 120, into one or more formats suitable for transmission as fax messages. When the server 120 receives an e-mail including an attached document, the attached document may not be in a format suitable for delivery as a fax, because conventional fax machines are not equipped to interpret and reproduce such document formats. Thus, the document translator 280 is configured to translate formats of electronic documents, as received by the server 120, into one or more formats suitable for transmission as fax messages. For example, the document translator 280 may convert a Microsoft Word® file or an Adobe® Portable Document Format (PDF) file to a Tagged Image File Format (TIFF) file before the job monitor and engine 220 delivers the electronic document as a fax. The document translator 280 is configured to translate among many common document formats and file formats. After translation of document into a format suitable for delivery as a fax, the server 120 may deliver the translated document as described herein.

The billing controller 270 is configured to calculate fees associated with incoming and outgoing e-mail, SMS messages, and faxes in connection with the inter-modal messaging service. The billing controller 270 is further configured to calculate fees based on billing rules stored in the billing database 264 for respective subscribers of the service. In certain aspects and embodiments, the billing controller 270 is configured to calculate the fees and generate billing invoices with reference to the log service 240, the customer database 262, and the billing database 264. For example, the billing controller 270 may calculate a fee for each SMS message transmitted by the server 120, each SMS message received by the server 120, each fax message delivered by the server 120, and each fax message received by the server 120. These examples are not meant to be limiting in nature, and the calculation of other fees by the billing controller 270 consistent with this disclosure are within the scope and spirit of the embodiments described herein. It is additionally noted that, the fees calculated by the billing controller 270 may be in addition to any fees charges by other service providers, such as cellular or internet connectivity providers.

The customer database 262 stores data associated with subscribers of the inter-modal messaging service, organized in separate user or subscriber accounts. It is noted that each account of the inter-modal messaging service may be configured based on certain parameters. The parameters of the service may define whether or not SMS message distribution is active, whether or not fax distribution is active, whether SMS message conversation mode is enabled, a maximum number of SMS messages that may be distributed based on a received e-mail, and other operational parameters, as examples. The parameters of the inter-modal messaging service for a subscriber account may be set by a user using a configuration web page provided by the web host of the network services 238, in one embodiment. In that context, a user may navigate to the configuration web page using a web browser of one of the computers 112, and update the parameters and other settings associated with the user's subscriber account. It is noted that updating the parameters and other settings may impact the generation of fees from the service. For example, setting a messaging parameter value associated with a maximum number of SMS messages that may be distributed based on a received e-mail can limit the fees for distributing SMS messages. In other words, limiting the number of SMS message to 2, rather than 4, for distribution based on a received e-mail addressed to a mobile telephone number at the "mail2SMS" domain, would reduce costs for the total number of SMS messages distributed.

Additionally, the billing controller 270, in various embodiments, is configured to calculate certain service fees for use of the "conversation mode" of the service, which is described in further detail below.

Returning to details of the operational aspects of the inter-modal messaging service, the inbound agent 234 is configured to receive an e-mail message transmitted from one of the computers 112 via the PSTN 130 and/or the data network 110. The e-mail message may be addressed to destination addresses associated with different modes of communication.

In connection with the e-mail to SMS, SMS to e-mail, e-mail to fax, and fax to e-mail gateway features and functions of the server 120 (i.e., the an inter-modal messaging services of the server 120), the server 120 is configured to re-distribute the received e-mail message, perhaps in portions or sections, to one or more of the mobile devices 132, one or more of the fax machines 142, or both the mobile devices 132 and the fax machines 142. As described in further detail below, the re-distribution is based upon factors such as the destination addresses associated with the received e-mail and parameters set by the subscriber that sent the e-mail to the server 120. Further, as described herein, re-distribution may be multi-modal and include the establishment of a conversation in a "conversation mode" of the service, according to a parameters set by a subscriber or user. In this context, at the outset of receipt of an e-mail message from one of the computers 112, the inbound agent 234 is configured to determine whether the e-mail message is a multi-modal distribution message based on its destination addresses and, when determining that the e-mail message is a multi-modal distribution message, forward the message to the job monitor and engine 220 to separate respective portions of the message for each mode of distribution.

For example, the inbound agent 234 may determine whether an e-mail message is a multi-modal e-mail message based on whether the e-mail message was addressed to domain names associated with separate modes of communication. In one embodiment, the inbound agent 234 may include a "mail2sms.com" mailbox domain for receiving messages destined for SMS messaging communications and a "mail2fax.com" mailbox domain for receiving messages destined for fax machine communications. When determining that an e-mail message is a multi-modal distribution message, the inbound agent 234 separates respective portions of the message for each mode of distribution. In various embodiments, the separation of the respective portions of the message may be performed by the inbound agent 234 or the job monitor and engine 220 based on one or more indicators or formatting attributes in the message.

Separation of multi-modal messages is desirable and, in many cases, necessary because an inbound e-mail message may include certain features which, while being suitable for distribution by fax, may not be suitable for distribution by SMS. An attachment to an e-mail, such as a Portable Document Format (PDF) attachment, for example, may not be suitable for distribution by SMS because of SMS protocol limitations, SMS messaging data limitations, or other reasons. Additionally, PDF attachments in an e-mail may be intended only for distribution via fax and not SMS, while text within a body of the e-mail may be intended for distribution via SMS. Other types of separation may also be desirable. For example, it may be desirable to remove an automatically-appended disclaimer, such as a legal disclaimer, from an e-mail message, before portions of the message are distributed. In certain circumstances, such legal disclaimers may be transmitted by fax and not SMS or discarded entirely and not transmitted by either fax or SMS. Along these lines, it may also be desirable or necessary to remove formatting attributes within an e-mail, such as HTML or Rich Text formatting handles and attributes, from any text separated for distribution by SMS messaging.

With regard to indicators and formatting attributes relied upon by the job monitor and engine 220 for separating respective portions of an e-mail message for distribution, the e-mail message may include a text-based separator such as "—SEPARATE HERE—", indicating a division between portions of the e-mail message to be communicated by SMS message and fax. In this embodiment, the job monitor and engine 220 may separate text above the text-based separator for distribution by SMS and/or fax, and discard the text below the text-based separator. Alternatively, the job monitor and engine 220 may separate text above the text-based separator for distribution by SMS, and the entire e-mail (i.e., above and below the separator) may be distributed by fax. In other embodiments, the job monitor and engine 220 may separate text between two text-based separators and discard the text that is not between the two text-based separators. As another example, the job monitor and engine 220 may separate or discard text from an e-mail having a certain attribute, such as small font size. In this manner, automatically-appended legal disclaimers may be identified and removed for one or more respective modes of distribution. The multi-modal message separation examples described above are not intended to be limiting, and separation for various purposes and by various means would be recognized by those having skill in the art.

In certain embodiments, the computers 112 may use templates, application plug-ins, form libraries, and/or other software services to assist users with drafting multi-modal distribution messages. According to aspects of the embodiments described herein, an SMS template or form for an e-mail client may offer an SMS entry field for entry of text for distribution by SMS messaging. After accepting the text entered in the SMS entry field, the template may incorporate the text into the body of an e-mail, set apart by one or more text-based separators, for example.

In certain embodiments, the template for the e-mail client may track the number of characters entered for an SMS message. In this way, a user is aware of the number of characters remaining for an SMS message, because SMS messages are generally limited in size. It is noted that SMS messages may be encoded using various character sets such as the Global System for Mobile Communication (GSM) 7-bit alphabet, the 8-bit data alphabet, and the 16-bit Universal Character Set (USC) UCS-2 alphabet, for example. Depending on the character set used by a wireless subscriber, the maximum SMS message sizes may be limited to 160 7-bit characters, 140 8-bit characters, or 70 16-bit characters. Thus, the template for the e-mail client may be configured for the transmission of SMS messages having 160 7-bit characters, 140 8-bit characters, or 70 16-bit characters. In connection with providing feedback to users regarding SMS message size in characters (e.g., "130 of 160 available characters entered"), the template may also provide feedback regarding the overlap of SMS message boundaries. In other words, the template may illustrate to the user that the number of characters entered will require multiple SMS messages for transmission. For example, if 180 7-bit characters are entered, in certain exemplary embodiments, the template may provide an indication that two SMS messages will be required for transmission. After drafting an e-mail using an SMS template or form of an e-mail client, as discussed above, the e-mail may be addressed and sent from the computer 112.

Returning again to details of the operational aspects of the inter-modal messaging service, after a short message portion of an inbound e-mail message is separated for distribution as an SMS message, the job monitor and engine 220 is configured, in certain embodiments, to parse the short message portion into a number of individual SMS short messages. For example, the job monitor and engine 220 is configured to parse the short message portion according to a predetermined short message size and messaging parameter value of the associated user's account. For example, after an e-mail message for distribution is received, a subscriber account associated with the received e-mail message is identified by the job monitor and engine 220 by a reverse-lookup or other means with reference to the customer database 262, for example, according to an originating IP address, domain, account handle, or other identifying information of the received e-mail. Once the subscriber account of the received e-mail is identified, the parameters of the subscriber account are accessed and referenced. The messaging parameter value or values of the subscriber account, which may be set as default values or set by a subscriber or user of the account as described above, are referenced when the job monitor and engine 220 parses the short message portion into the number of individual SMS short messages for distribution. In other words, if the separated portion of the received e-mail includes 340 characters of text, the predetermined short message size is 160 characters, and the user has set the messaging parameter value to distribute a maximum of 2 SMS messages for any received e-mail, the job monitor and engine 220 parses the 340 separated characters of text into two SMS messages (i.e., 320 characters) and discard 20 characters. In various embodiments, the job monitor and engine 220 may parse separated characters starting with the first separated characters (i.e., the first of the 340 characters), although parsing may begin at any position among separated characters.

In other embodiments, the job monitor and engine 220 may rely on other services to parse the short message portion, or the job monitor and engine 220 may only calculate the number of SMS messages required to transmit the short message portion, without actually dividing or parsing it, for billing and logging purposes. It is also noted that the predetermined short message size may depend upon the character set selected for distribution of the SMS messages. The character set for distribution of SMS messages may be set according to parameters of subscriber's accounts.

The job monitor and engine 220 is further configured to establish an SMS conversation comprising conversation attributes based on a short message conversation parameter of the subscriber account. That is, before the distribution of any SMS messages, the job monitor and engine 220 references a short message conversation parameter of the subscriber account, which also may be set as a default value or by a user as described above, to determine whether distribution of SMS messages is to be in "conversation mode," as further described below. After establishing a "conversation," if necessary, according to the short message conversation parameter of the subscriber account, the job monitor and engine 220 is configured to direct the SMS agent 235 to transmit one or more SMS messages comprising the short message portion of the e-mail message via the data network 110. Here, it is noted that the SMS messages are transmitted or distributed according to the destination address specified in the e-mail. For example, if the received e-mail was addressed to <123-456-7890@mail2sms.com>, the SMS agent 235 would transmit the SMS messages to the mobile telephone having the phone number 123-456-7890.

In one embodiment, the SMS agent 235 transmits SMS messages using the SMS aggregator 290. The SMS aggregator 290 provides connectivity with cellular phone carriers by offering a gateway to send and receive messages and other digital content to cellular subscribers.

To send SMS messages via the SMS aggregator 290, the SMS agent 235 is configured to provide certain transmission parameters and a body of text for distribution by SMS to the SMS aggregator 290. In one embodiment, as the transmission parameters, the SMS agent 235 provides a character set and destination phone number for delivery of SMS messages, a sending short code for originating the SMS messages, and a maximum number of SMS messages to be delivered. It is noted that the maximum number of SMS messages to be delivered may be determined according to the associated messaging parameter value set by the subscriber. That is, the messaging parameter value set by the subscriber to limit the total number of SMS messages to be delivered for any received e-mail, as discussed above. In certain embodiments, the SMS agent 235 may also provide to the SMS aggregator 290 a unique job identifier to be associated with a request for SMS message transmission. The unique job identifier may be relied upon by the SMS agent 235 and the SMS aggregator 290 to verify or query the status of a particular SMS transmission job.

The SMS aggregator 290, in turn, is configured to parse the body of text for distribution by SMS messages based on the maximum number of SMS messages to be delivered, and deliver those SMS messages to the destination specified by the destination phone number. The SMS aggregator 290 will deliver the SMS messages using the sending short code and according to the character set provided by the SMS agent 235. As described in further detail below, the sending short code is identified by the job monitor and engine 220. In various embodiments, several short codes are requisitioned for use by the server 120 in connection with the distribution of SMS messages.

After the SMS aggregator 290 transmits the SMS messages, the SMS aggregator 290 is configured to return a confirmation of delivery, in association with the unique job identifier provided by the SMS agent 235 for the job. The SMS aggregator 290 additionally provides feedback to the SMS agent 235 including the number of SMS messages sent. Generally, the number of SMS messages sent by the SMS aggregator 290 should be the same number of messages specified by the SMS agent 235 when requesting the SMS message distribution. It is noted that the SMS aggregator may be configured to identify an appropriate cellular carrier for transmission of SMS messages based on the destination phone number for the SMS messages.

As noted above, SMS messages are delivered in association with short codes in place of an originating telephone number of a mobile device, in certain embodiments described herein. It is noted that short codes are generally shorter than telephone numbers and are relied upon to send and receive SMS messages in wireless cellular services—without the use of a full telephone number as an originating or destination address. In other words, short codes are used as replacements or substitutes for actual mobile telephone numbers, particularly for delivery and receipt of SMS messages in connection with parties that offer services via SMS messaging.

Short codes may be distinguished as sending (i.e., originating) and receiving short codes. In certain circumstances, short codes may be associated with automated services such as automated programs that handle responses and typically require a user to start a message with a particular command, word or prefix. In turn, the service responds to the command appropriately. An automated service may offer a short code for receipt of SMS messages, and the short code may be used to aggregate several messages received from the mobile telephones. Similarly, a short code may be used to send SMS messages to several (may be hundreds or thousands of) mobile telephones from an information or emergency announcement service. It is noted that short codes may be impacted by regional differences. For example, within the European Union, short codes may start with the digits "11" while, in Canada, short codes beginning with "4" may be reserved for private use of wireless carriers. Further, in certain countries, short codes may comprise either five or six digits depending upon the region.

To facilitate sending SMS messages to almost any wireless mobile phone device and because the server 120 maintains the inter-modal messaging service for many subscribers, the server 120 relies upon a certain number of short codes for several regions which the server 120 provides SMS message distribution to. In other words, each SMS message delivered by the server 120 can be delivered using a short code from a pool of short codes for SMS message delivery for a region. Because a pool of short codes may be required for a plurality of different regions, such as the United States, Canada, and other foreign countries, the server 120 may only be able to provide SMS message delivery services to those regions for which short codes are available.

For one-way SMS message delivery, a small pool of short codes may be relied upon to send several SMS messages for multiple subscribers of the inter-modal messaging service, because the transmission of each SMS message takes very little time. In other words, the delivery of SMS messages for several different subscribers may occur in sequence using a small pool of short codes until all SMS messages have been delivered.

For two-way SMS messaging or "conversation mode," which permits communications between the mobile devices 132 and the computers 112, for example, a short code from a pool of short codes is assigned to a particular "conversation" and is relied upon for at least a predetermined period of time. In this context, the size of the pool of short codes limits the number of conversations that the server 120 can maintain, because one short code is required for each conversation. As described in further detail below with regard to the process flow diagrams, the job monitor and engine 220 is configured to determine a short code for use in delivery of SMS messages and, if so configured, determine a short code for establishing a conversation. When establishing a conversation, the short code relied upon for delivery of the SMS message is provided to the aggregator 290, and the job monitor and engine 220 maintains a log of the conversation for SMS messages received in association with the assigned short code for the conversation. Any received SMS messages that are associated with the assigned short code are, in turn, provided back to the subscriber that transmitted or sent the original e-mail originating the conversation. In this manner, a two-way conversation between a user of one of the computers 112 and one of the mobile devices 132 is maintained. Further details on the multi-modal messaging service provided by the server 120 are described below with reference to FIGS. 4-8.

Figure 3:
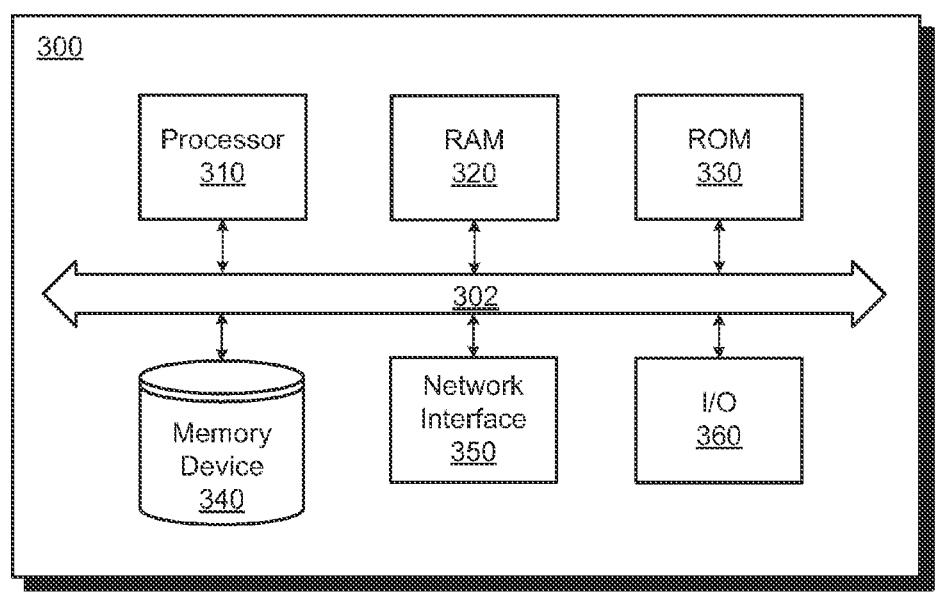
FIG. 3 illustrates an example circuit diagram of a computer.

FIG. 3 illustrates an example hardware diagram of a computer 300. Any of the computers 112, the mobile devices 132, the fax machines 142, and the server 120 may be implemented using combinations of one or more of the elements of the general purpose computer 300. The computer 300 includes a processor 310, a Random Access Memory (RAM) 320, a Read Only Memory (ROM) 330, a memory (i.e., storage) device 340, a network interface 350, and an Input Output (I/O) interface 360. The elements of the computer 300 are communicatively coupled via a bus 302.

The processor 310 can comprise any suitable arithmetic processor known to those skilled in the art.

Both the RAM 320 and the ROM 330 can comprise suitable random access and read only memory devices, respectively, that store computer-readable instructions to be executed by the processor 310, as known to those skilled in the art. The memory device 340 stores computer-readable instructions thereon that, when executed by the processor 310, direct the processor 310 to execute various aspects of the invention described herein. As a non-limiting example group, the memory device 340 may comprise one or more of an optical disc, a magnetic disc, a semiconductor memory (i.e., a flash based memory), a magnetic tape memory, a removable memory, combinations thereof, or any other well-known memory means for storing computer-readable instructions. The I/O interface 360 comprises device input and output interfaces such as keyboard, pointing device, display, communication, and other interfaces. The bus 302 electrically and communicatively couples the processor 310, the RAM 320, the ROM 330, the memory device 340, the network interface 350, and the I/O interface 360, so that data and instructions may be communicated among the processor 310, the RAM 320, the ROM 330, the memory device 340, the network interface 350, and the I/O interface 360. In operation, the processor 310 is configured to retrieve computer-readable instructions stored on the memory device 340, the ROM 330, or another storage means, and copy the computer-readable instructions to the RAM 320 for execution. The processor 310 is further configured to execute the computer-readable instructions to implement various aspects and features of the invention described herein. For example, the processor 310 may be adapted and configured to execute one or more of the elements of the processes described below with reference to FIGS. 4-8.

Before turning to the process flow diagrams of FIGS. 4-8, it is noted that the invention may be practiced using an alternative order of the steps illustrated in FIGS. 4-8. That is, the process flows illustrated in FIGS. 4-8 are provided as examples only, and the invention may be practiced using process flows that differ from those illustrated. Additionally, it is noted that not all steps are required in every embodiment. In other words, one or more of the steps may be omitted or replaced, without departing from the spirit and scope of the invention.

Figure 4:
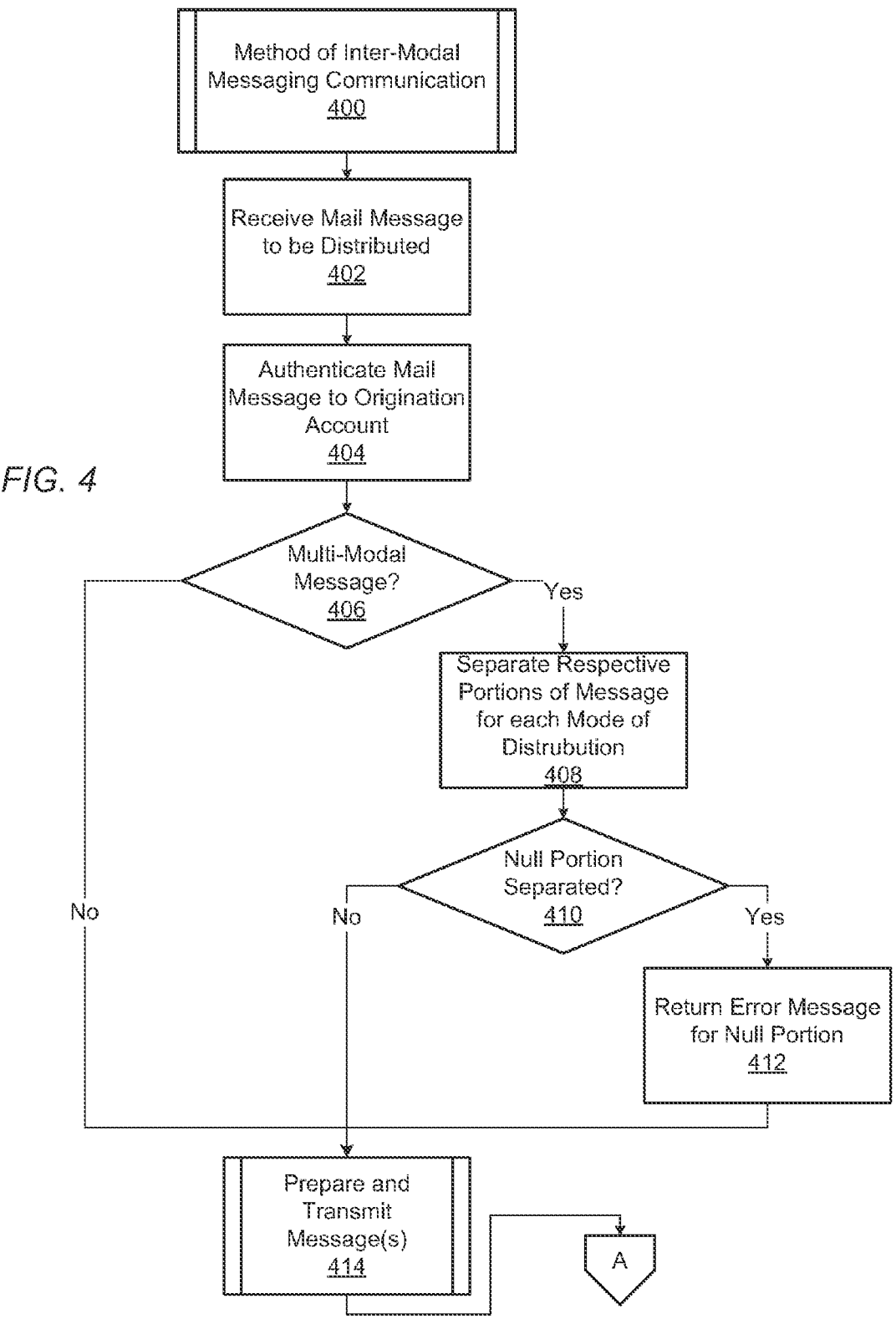
FIG. 4 illustrates an example method of inter-modal messaging communication.

Turning to FIG. 4, a method of inter-modal messaging communication 400 is illustrated. It is noted that the method 400 is described in connection with the elements in the example embodiments illustrated in FIGS. 1 and 2, but may be performed by other system configurations or embodiments. Beginning at step 402, the server 120 receives a mail message to be distributed. For example, the inbound agent 234 of the server 120 may receive an e-mail message from one of the computers 112 at step 402. As discussed above, the mail message may comprise an e-mail message sent from an e-mail client of one of the computers 112, and the mail message may be addressed for distribution to several different addresses.

At step 404, the inbound agent 234 authenticates the received mail message to an origination account. In other words, the inbound agent 234 authenticates the received mail message with reference to the customer data base 262 and/or the billing database 264, to determine whether the mail message is received by a current subscriber of the inter-modal messaging service provided by the server 120. It is noted that messages received from users that are not current subscribers of the service will be identified by the server 120 and not redistributed. In certain embodiments, when a mail message is received from a party that is not a current subscriber of the inter-modal messaging service, a return message is provided by the server 120 indicating that the message was not originated from a subscriber of service and/or that the message will not be distributed.

At step 406, the server 120 determines whether the received message is a multi-modal message. For example, the inbound agent 234 may determine whether the received message is a multi-modal message based on whether the message was addressed to domain names associated with separate modes of communication, as described above. As described above, for example, a message may be addressed to both SMS message and fax destinations, such as <1234567890@mail2sms.com> and <1234567891@mail2fax.com>. In other embodiments, the inbound agent 234 may determine whether the received message is a multi-modal message based on the content of the message, formatting of the message, or other triggers or attributes of the message.

When the inbound agent 234 determines that the received mail message is a multi-modal message at step 406, the process proceeds to step 408 where the server 120 separates portions of the message for each mode of distribution. For example, the job monitor and engine 220 may separate portions of the received mail message for separate communication by SMS message and fax. As discussed above, separation of the message is desirable and sometimes necessary because a received message may include features suitable for only one mode of distribution, although it may be addressed for distribution as both SMS and fax. For example, the server 120 may receive an e-mail addressed for both SMS and fax distribution, although the e-mail may comprise only a single attachment without text in either the subject line or the body. While the attachment may be sent to the document translator 280, if necessary, and distributed to one of the fax machines 142 as an image for reproduction, no associated text is available for SMS messaging. It is noted that, in step 408, the job monitor and engine 220 may separate portions of the received mail message according to message formatting, attachments, text-based separators, font size, or other attributes and factors. These separation factors are provided by way of example only and other means, methods, and factors for separating portions of a message for distribution are within the scope and spirit of this disclosure.

At step 410, the server 120 determines whether a null portion was separated at step 408. Particularly, the job monitor and engine 220 determines whether a separated portion of the received mail message has no text, image, or other portion to form a message for distribution.

For example, as discussed above, the separation of a message that comprises only an attachment may result in a null portion separated for distribution by SMS messaging. When a null portion is separated at step 410, the server 120 proceeds to step 412 and returns an error message to the originator of the message. In one embodiment, the return error message includes an indication that a separated SMS or fax portion for distribution is "empty" and cannot be distributed.

Alternatively, when no null portion is separated by the job monitor and engine 220 at step 410, the process proceeds to step 414 where the separated portions of the mail message are prepared and transmitted. In alternative embodiments, steps 410 and 412 may be omitted. It is noted that steps 410 and 412 are performed in certain embodiments because, although an originator addressed the message to more than one destination (i.e., the message is multi-modal), a null or empty message has been separated for at least one of the destinations.

In the example embodiment illustrated in FIG. 4, when the inbound agent 234 determines that the received mail message is not a multi-modal message at step 406, the separation of respective portions of the message is unnecessary and the process proceeds directly to step 414. In alternative embodiments, steps similar to steps 408, 410, and 412 may be performed even when a received message is determined not to be multi-modal at step 406. For example, if a message is addressed for distribution only as an SMS message, separation similar to that in step 408 may still occur between steps 406 and 414, because it is likely that not all of the message(s) would be suitable for SMS message distribution. In some embodiments, the server 120 may also send a return error message if a null or empty message is received for distribution, even if the message is not a multi-modal message.

Figure 5:
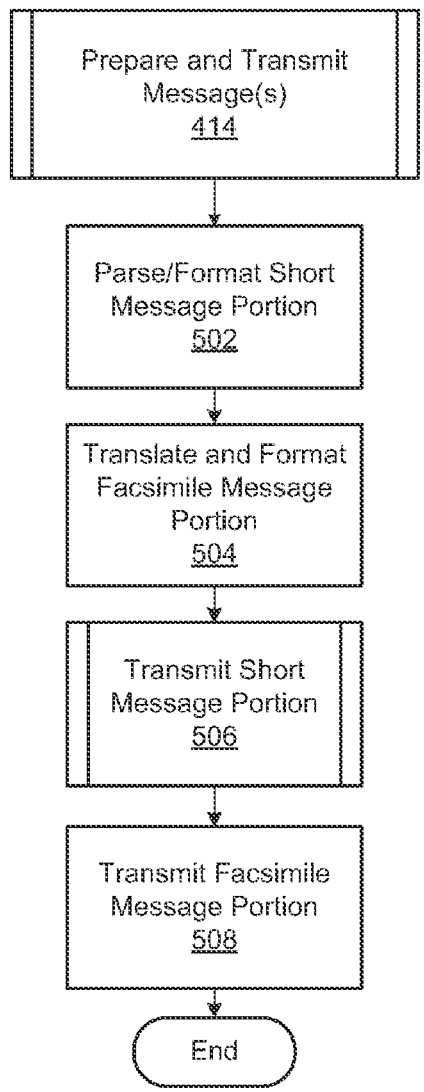
FIG. 5 illustrates an example method of preparing and transmitting messages.

Turning to FIG. 5, a method of preparing and transmitting messages 414 is illustrated. At step 502, the server 120 parses or formats any short message portion for distribution. For example, the job monitor and engine 220 may parse the short message portion into a number of individual short messages according to user- or subscriber-defined parameters, such as a messaging parameter value defining the maximum number of SMS messages to be distributed for any received message for distribution. Additionally, certain text and/or formatting attributes included within a body of a received mail message may be removed at step 502 before the portion is transmitted as an SMS message. In general, at step 502, the short message portion is formatted to comply with the required format (e.g., text) for SMS messaging as understood in the art.

At step 504, the job monitor and engine 220 translates and formats any facsimile message portion for distribution. For example, in connection with the document translator 280, the job monitor and engine 220 may translate and format any facsimile message portion into a file format suitable for distribution by fax. As discussed above, a file format such as a Microsoft Word® file or an Adobe® PDF file may be translated into a Tagged Image File Format (TIFF) file by the document translator 280, to provide a document format suitable for distribution to the fax machines 142. It is noted here that, depending upon whether the received mail message is a multi-modal message, one of the steps 502 and 504 may be omitted, as necessary. That is, if the received mail message does not include any short message portion, the step of parsing or formatting the short message portion at 502 may be omitted. Alternatively, if the received mail message does not include any facsimile message portion, the step of translating and formatting the facsimile message portion at 504 may be omitted. Additionally, if a mail message for distribution is not addressed for SMS messaging or facsimile, one or more of the steps 502 and 504 may be omitted accordingly. Finally, it is noted that, as with the other steps in FIGS. 4-8, steps 502 and 504 may be performed concurrently or in an order or sequence that differs from that illustrated in FIG. 5.

Proceeding to step 506, the server 120 transmits the short message portion. At step 508, the server 120 transmits the facsimile message portion. As discussed above, the SMS agent 235 may transmit the short message portion 506, and the fax agent 236 may transmit the facsimile message portion at step 508. It is again noted that one or more of the steps 506 and 508 may be omitted, as necessary. Particularly, if no facsimile message portion is included within a mail message for distribution, step 508 may be omitted. Similarly, if no short message portion is included within a mail message for distribution, step 506 may be omitted.

Figure 6:
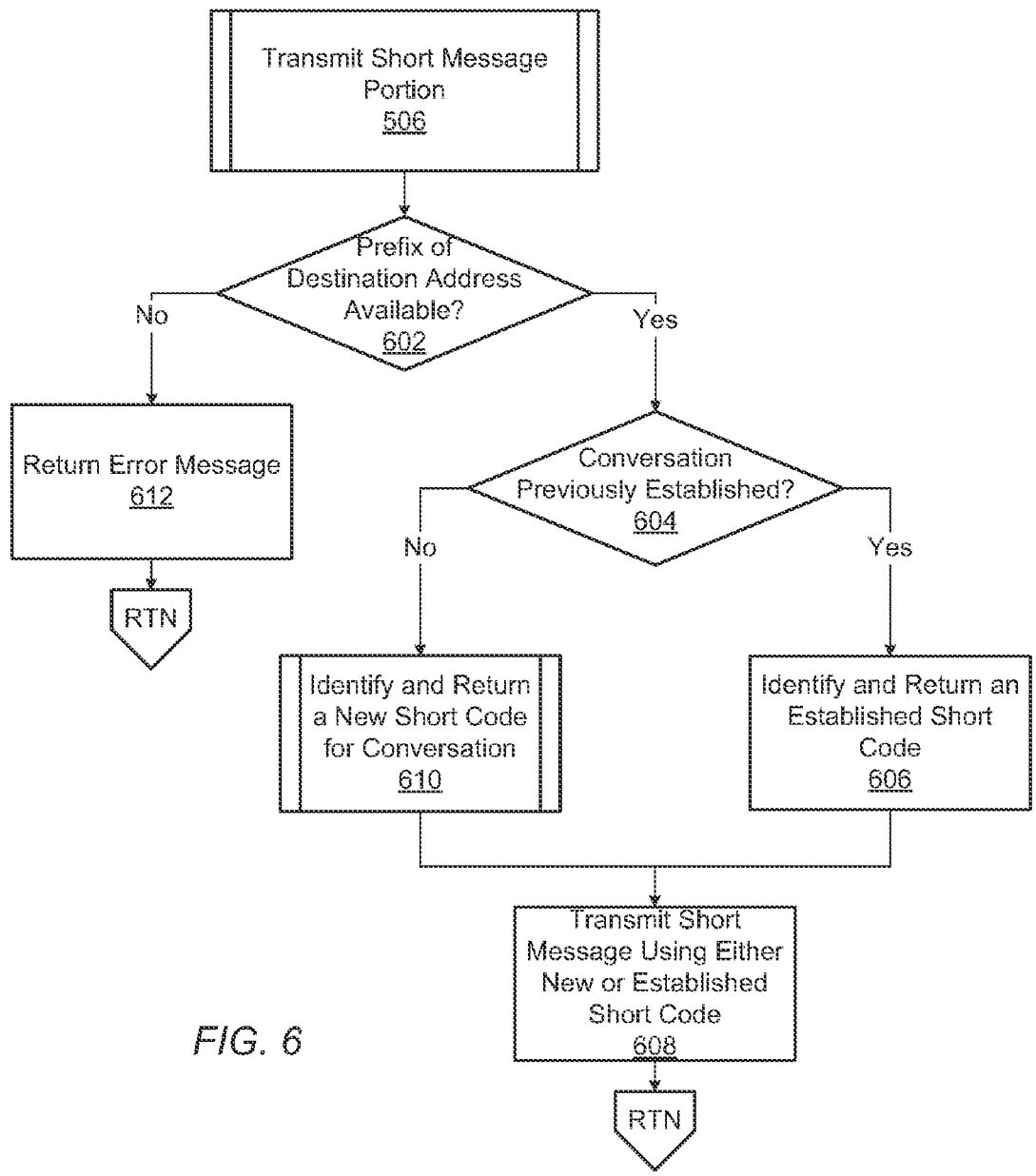
FIG. 6 illustrates aspects of an example method of transmitting a short message portion of a received mail message.

Turning to FIG. 6, further aspects of transmitting the short message portion at step 506 are described. At step 602, the server 120 determines whether a country code and/or prefix of a destination address of the short message portion matches an available set of short codes in a short code pool table. In other words, the job monitor and engine 220 references the destination address for the short message portion and identifies a country code and a prefix of the destination address of the short message portion. For example, in the destination address 44 20 1234 5678, the country code or international prefix "44" is identified by the job monitor and engine 220 and the regional prefix "20" is identified by the job monitor and engine. As another example, in the destination address 1 555 123 4567, the country code or international prefix "1" is identified by the job monitor and engine 220 and the regional prefix "555" is identified by the job monitor and engine.

After identifying one or more prefixes of the destination address, the job monitor and engine 220 references a short code pool table to determine whether a short code is available for the prefix. As discussed above, the server 120 relies upon a certain limited number of short codes for each region in which the server 120 distributes SMS messages. That is, each SMS message delivered by the server 120 will be delivered using a short code from a limited pool of short codes for a region. Table 1 below provides an example of a regional short code table. In Table 1, the country code or international prefix "1" includes a plurality of short codes.

Particularly, the international dial prefix "1" is associated with short codes for the United States and Canada and includes short codes ranging from 22330 to 22336. Similarly, the country code "44" is associated with short codes for the United Kingdom and includes short codes from 63440 to 63446. Additional short codes for the international prefix "33", for France, are also provided as an example in Table 1. The regional short code pool table may be stored in any memory of the server 120, among embodiments.

TABLE 1

Regional Short Code Pool Table

| International Dial Prefix | Short Code | Notes |
| --- | --- | --- |
| 1 | 22330 | US and Canada Short Codes; International Dial Prefix of "1" |
| 1 | 22331 | . . . |
| . . . | . . . | . . . |
| 1 | 22336 | . . . |
| 44 | 63440 | United Kingdom Short Codes; International Dial Prefix of "44" |
| . . . | . . . | . . . |
| 44 | 3446 | |
| 33 | 34440 | France Short Codes; International Dial Prefix of "44" |
| . . . | . . . | . . . |
| . . . | 34446 | . . . |

For a short message portion to be delivered within the United States or Canada with a prefix of "1", the job monitor and engine 220 identifies, at step 602, that short codes 22330 to 22336 are available for use. If the job monitor and engine 220 determines by reference to the regional short code pool table that no short codes are available for the dial prefix of a destination address, the process proceeds to step 612 where the job monitor and engine 220 returns an error message to an originator of the mail message for distribution. In this context, the return error message may include an indicator that the server 120 is unable to deliver an SMS message to the region specified by the destination address because no short codes are available for the region.

In various embodiments, the return error message may include any suitable indicator or description of the error. It is noted that certain regions may not be serviceable by the server 120 for various reasons including lack of available short codes for delivery of messages. In certain embodiments, the short code pool table includes codes for nearly every region, but might only include a limited number of (or no) short codes for conversations. In certain regions, the short code pool table may include one or more default short codes dedicated to the communication of messages without establishing a conversation. As such, certain regions may include short codes for conversations and dedicated non-conversation short codes.

When it is determined at step 602 that short codes are available for the prefix of the destination address of the short message portion, the process proceeds to step 604 where the server 120 determines whether a conversation was previously established. Here, the job monitor and engine 220 determines whether, based on the destination address of the short message portion, a conversation has been previously established between the originator of the mail message and the destination address of the short message portion. Because, as discussed above, short codes are assigned to "conversations" between an originator of a mail message received by the server 120 and a destination address of the short message portion of the mail message, the server 120 first determines whether a short code is already associated with the conversation. It is noted that because maintenance of a "conversation" as described herein requires the assignment of a short code for exclusive use by the conversation (so long as the conversation is maintained), the server 120 is capable of maintaining only a limited number of conversations—because only a limited number of short codes are available per region. The number of short codes for use by the server 120 is limited for various reasons including, for example, the costs associated with registering the codes and the limited number of codes available for overall use in networks providing SMS services. For certain subscribers or users of the inter-modal messaging service, it is noted that short codes may be assigned. That is, the server 120 may provide assigned-short-code services to certain subscribers. In that case, the server 120 may first look to and use the short code assigned to the customer for distributing SMS messages, before making reference to the short code pool table.

At step 602, the server 120 may additionally reference the parameters of the subscriber that originated the mail message, to determine whether the subscriber has elected to use the conversation mode feature for delivery of SMS messages. In other words, the server 120 may offer the conversation mode as an option to subscribers of the inter-modal messaging service, and users may elect not to deliver SMS messages using the conversation mode. As a practical matter, the difference between establishing a conversation when distributing an SMS message or not establishing a conversation amounts to the maintenance of two-way messaging between the destination address of an SMS message and the originator of a mail message received by the server 120. In other words, using the conversation mode permits a user at one of the computers 112 to send a mail message, distribute an SMS message including text from the mail message, and receive replies to the distributed SMS message by return mail message. If the conversation mode is not elected by the subscriber of the inter-modal service, SMS messages are simply distributed without any method or means to permit forwarding replies to distributed SMS messages back to the subscriber.

When, at step 604, the server 120 determines that a conversation was previously established, the server proceeds to step 606 and identifies and returns an established short code for the conversation. Alternatively, at step 604, when the server determines that a conversation was not previously established, the server 120 proceeds to step 610 and identifies and returns a new short code for the conversation. An additional description of identifying and returning a new short code is provided below with reference to FIG. 7.

The job monitor and engine 220 determines whether a conversation was previously established at step 604, in one embodiment, with reference to one or more conversation parameter tables, each established for a particular conversation maintained by the server 120. An example conversation parameter table is provided in Table 2 below. Each conversation parameter table includes parameters, such as a sender id, a job number, a billing subjob, an item number, a recipient address type, a recipient address, a short code identifier, a start time, and an expiration time, as provided in the example Table 2 below. It is noted that a conversation parameter table may include fewer or additional parameters than those provided in Table 2, in various embodiments, as necessary. In one aspect, each conversation parameter table specifies an identifier of the original SMS message that established the conversation (i.e., a sender identifier). In this context, a sender identifier may be associated with the subscriber of the inter-modal messaging service that originated the mail message leading to the distribution of the original S1\1S message that established the conversation. The job number and billing subjob in the table are associated in certain embodiments with processes performed by the billing controller 270. For queries among multiple conversation parameter tables, for example, an item number or unique identifier for a conversation is provided in the conversation table. In other words, with reference to the item number or unique identifier of the conversation tables, the job monitor and engine 220 is able to search among and query individual conversation tables, to identify certain ongoing conversations, for example. Each conversation table further includes a recipient address, such as a mobile telephone number for distributing SMS messages. The short code used for transmitting SMS messages in a conversation is also stored in the conversation parameter table for the conversation. Additionally, a start time and an end or expiration time of the conversation is stored in each conversation table.

TABLE 2

Conversation Parameter Table

| Parameter Name | Data Type | Description |
| --- | --- | --- |
| sender_id | integer | An identifier of the subscriber that initiated the conversation with the recipient. |
| jobno | integer | The job number of the delivery that established the conversation. |
| billsj | integer | Billing subjob of the delivery that established the conversation. |
| xqn | integer | XQN (item number) of the delivery that established the conversation. |
| recipient_address_type | string | Address type of the recipient. For this initial design the value here will always be "sms", but eventually other options might be possible. |
| recipient_to | string | Recipient address, in normalized form. |

TABLE 2-continued

Conversation Parameter Table

| Parameter Name | Data Type | Description |
| --- | --- | --- |
| short_code | string | The short code used by this conversation |
| star_time | date/time | Time this conversation was established. |
| expiration_time | date/time | Time when this conversation should be deactivated. |

With regard to the start and expiration times of a conversation, the start time and end times are generally set when a first SMS message is distributed to start a new conversation. For example, if an SMS message that opens a conversation is distributed at 1:13 pm, the conversation table for the conversation will be updated by the server 120 to store "1:13 pm" as the start time, in one or more computer-recognized data types or syntaxes. In certain embodiments, conversations are only permitted to last for a particular amount of time, such as 30, 60 or 90 minutes, for example. As such, the start and end times of a conversation are an important aspect for maintenance of the conversation. At the outset of establishing a new conversation, an expiration time is stored in the conversation table for the conversation by the server 120. In various embodiments, the expiration time may be an absolute time reference (e.g., 30, 60, or 90 minutes) or a time reference relative to the start time (e.g., 1:43 pm, 2:13 pm, or 2:43 pm).

The expiration time for a conversation is generally associated with a time after which SMS message replies will be discarded or not associated as part of the established conversation.

Replies to an SMS message occurring after the expiration time, in certain embodiments, are not returned back to an originator of the SMS message, although they might cause a message to be sent back to the replying party that indicates the conversation has expired. In certain embodiments, the expiration time may be reset (or extended) upon the distribution of another SMS message in the conversation or the receipt of an SMS message reply in the conversation. In other embodiments, the expiration time may not be reset or extended, regardless of any additional SMS messages distributed or replies received.

Referring back to FIG. 6, the job monitor and engine 220 determines whether a conversation was previously established at step 604 by a query among established conversation parameter tables maintained by the server 120. For example, before distributing an SMS message, the job monitor and engine 220 may compare the destination address of the SMS message with the recipient addresses in established conversation parameter tables, to determine whether the destination address is already associated with an established conversation. As discussed above, when, at step 604, the server 120 determines that a conversation was previously established for the destination address for a particular sender and recipient, the server 120 proceeds to step 606 and identifies and returns the established-short code for the conversation listed in the conversation parameter table for the conversation. In certain embodiments, the job monitor and engine 220 may also update the start and or expiration times in the conversation parameter table when identifying and returning the established short code. It is noted that the identification and return of the established short code permits the conversation to maintain a single unitary thread or channel for inter-modal messaging. Particularly, if a mobile device 132 receives several SMS messages from the same short code, the mobile device 132 is likely to organize those SMS message as being from a single party. Thus, any SMS message replies will also, consistently, be to the same short code. Alternatively, when, at step 604, the server 120 determines that no conversation was previously established for a destination address of an SMS message to be distributed, the server 120 proceeds to step 610 and identifies and returns a new short code for the conversation. The identification and return of a new short code for a conversation at step 610 is described in further detail below with reference to FIG. 7.

Proceeding to step 608, the SMS agent 235 transmits the short message portion (using either the established or new short code returned in either step 606 or step 610) and the process returns. In certain embodiments, as discussed above, the SMS agent 235 transmits the short message portion using the SMS aggregator 290.

Figure 7:
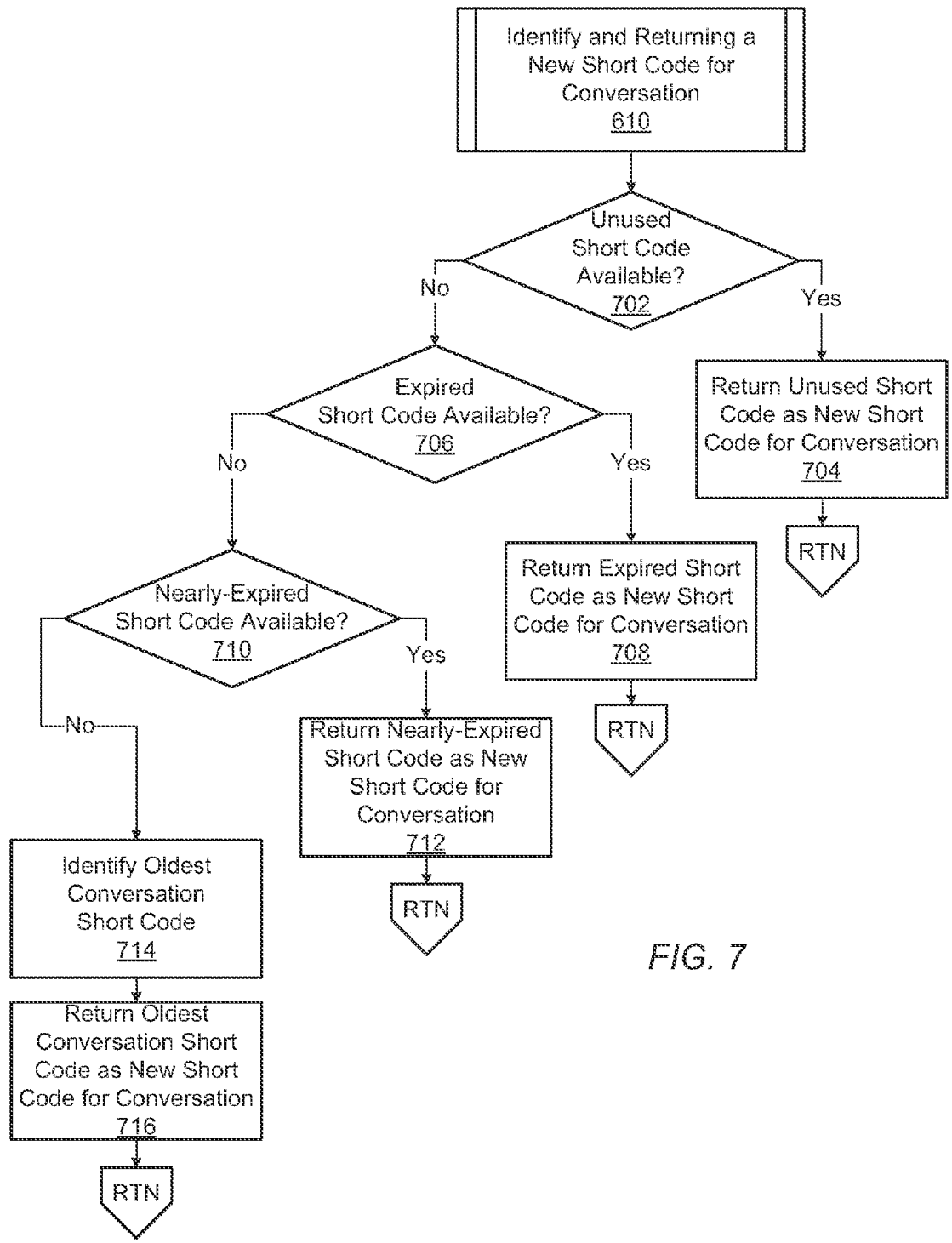
FIG. 7 illustrates aspects of an example method of identifying and returning a new short code for a conversation.

Turning to FIG. 7, further aspects of identifying and returning a new short code for a conversation at step 610 are described. Here, it is noted that the job monitor and engine 220 previously identified, at step 604, that no conversation was previously established for a short message to be distributed. Thus, no short code is associated with a conversation for the destination address of the short message to be distributed, and a new short code must be identified to maintain a new conversation. First, at step 702, the job monitor and engine 220 determines whether an unused short code is available for a new conversation. With reference back to the short code pool table in Table 1, if any short code is available (i.e., unused or unassociated) for the region which the short message is to be distributed, that short code is identified at step 702 and returned as an unused short code for a new conversation at step 704.

When no unused short code is available, at step 706, the job monitor and engine 220 determines whether an expired conversation short code is available. In this context, an expired conversation short code is a short code associated with a conversation that has "expired". In other words, the expiration time specified in the conversation table for the conversation has passed, because no short messages have been distributed or replies received for the conversation (i.e., the conversation is stale). At step 706, in certain embodiments, the job monitor and engine 220 may query all conversation parameter tables searching for a conversation table associated with an expired conversation. Upon identifying a conversation table associated with an expired conversation, the job monitor and engine 220 identifies and returns the short code associated with the expired conversation as a new short code for the conversation at step 708.

It is noted that, in certain embodiments, although a conversation be stale or expired because of a lack of short messages being distributed or replies received in the conversation, the server 120 may still "maintain" the conversation. That is, if there is no present need for new short codes for new conversations, a short code for an expired conversation is not necessarily unassociated or placed back into a pool of short codes unassociated with conversations. Instead, the short code is maintained for the conversation in the case that another short message is distributed or reply received in the conversation, even outside the expiration period of the conversation, to maintain continuity for the conversation, if possible. In certain embodiments, the job monitor and engine 220 may purge expired conversations (i.e., delete conversation parameter tables) for conversations that have remained stale for a certain period of time beyond the expiration time of the conversation, such as 12 24, or 36 hours, for example. In other embodiments, the job monitor and engine 220 may purge expired conversations on a regular periodic schedule, such as every 12 24, or 36 hours, for example, regardless of how long the conversations have been stale.

When no short code is determined to be available at step 702 and no short code is determined to be associated with an expired conversation at step 706, the process proceeds to step 710 where the job monitor and engine 220 determines whether a nearly-expired short code is available. In other words, because the number of short codes is limited by region, a new conversation may require the removal of a short code associated with an ongoing conversation for use in a new conversation. In this context, a nearly-expired short code is a short code associated with a conversation that is about to expire. In one embodiment, at step 710, the job monitor and engine 220 may query all conversation parameter tables and determine which conversation is the closest to expire among all conversations. In another embodiment, at step 710, the job monitor and engine 220 may query the conversation parameter tables for conversations that will expire within a predetermined amount of time such as 15, 20, or 30 minutes, for example, when seeking to identify a nearly-expired short code. In this embodiment, the query for a nearly-expired short code is completed upon the immediate finding of a conversation that will expire within the predetermined amount of time.

Upon identifying a nearly-expired short code at step 710, the job monitor and engine 220 returns the nearly-expired short code as a new short code for the conversation at step 712. It is noted that, in certain exemplary embodiments, the identification of a nearly-expired short code for use in a new conversation at step 710 occurs once it is determined at steps 702 and 706 that no short codes are available or associated with expired conversations.

In the case that no nearly-expired short code is identified at step 710, the process proceeds to step 714 where the job monitor and engine 220 identifies an oldest conversation short code and, at step 716, returns the oldest conversation short code as a new short code for the conversation. In one embodiment, at step 714, the job monitor and engine 220 may query all conversation parameter tables and determine which conversation is the oldest among all conversations. In other words, with reference to the start times of each of the conversations, the job monitor and engine 220 determines which conversation has been maintained for the greatest period of time. Here, the conversation that has been maintained for the greatest period of time is the oldest. Upon identifying an oldest short code at step 714, the job monitor and engine 220 returns the oldest short code as a new short code for the conversation at step 716. After a short code is returned at any of steps 704, 708, 712, or 716, the process returns.

It is noted that the process for identifying and returning a short code illustrated in FIG. 7 may be varied depending upon the embodiment. Various embodiments may more strictly maintain short codes with ongoing conversations. In this case, steps 710 and 712 may be omitted, for example. Further, as a default measure, certain embodiments may reserve a short code for use when all other short codes are associated with conversations. In this case, if all short codes are used in conversations, the reserved short code may be relied upon. In this case, a message may be provided back to the originator of the short message, informing the originator that no conversation was established due to lack of sufficient short codes, for example.

Figure 8:
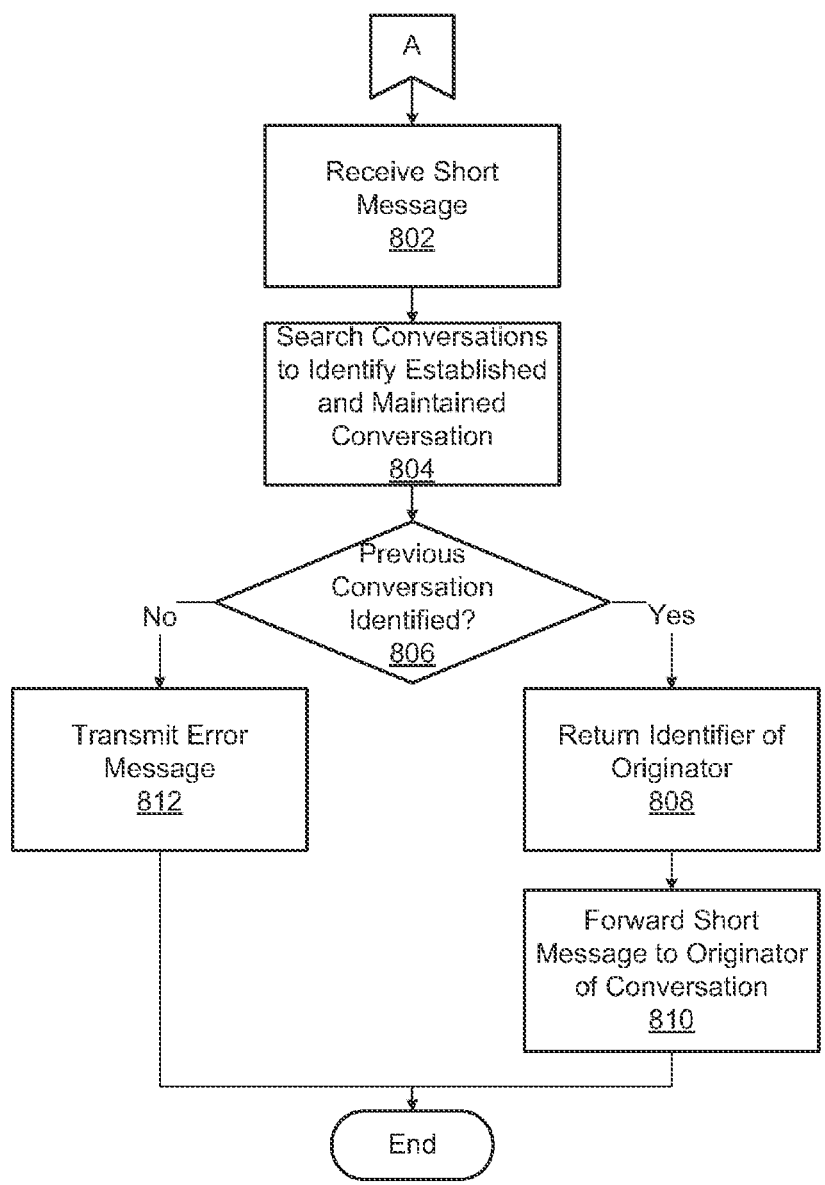
FIG. 8 illustrates further aspects of an example method of inter-modal messaging communication.

Turning to FIG. 8, further steps of the method of inter-modal messaging communication 400 are illustrated. At step 802, the server 120 receives a short message. For example, a short message may be received from one of the mobile devices 132. In certain embodiments, the SMS agent 235 receives a short message via the SMS aggregator 290. The short message is received at step 802 in association with a short code or short messaging address assigned to the server 120. In other words, the server 120 receives short messages addressed to short codes (as short messaging addresses) assigned (i.e., registered) to the server 120. These short codes assigned to the server are generally the same short codes listed in the regional short code pool table of Table 1.

At step 804, the job monitor and engine 220 searches conversations maintained by the server 120 to identify an established conversation associated with or attributed to the received short message. For example, the job monitor and engine 220 queries the conversation parameter tables to determine whether, for the short code associated with the short message received at step 802, a conversation is presently maintained by the server 120 in connection with the short code.

Here, the server 120 seeks to maintain continuity of the conversations maintained by the server 120.

At step 806, depending upon whether the job monitor and engine 220 identifies an established conversation at step 804, the process proceeds to step 808 or step 812. That is, as illustrated in the example embodiment of FIG. 8, when the job monitor and engine 220 identifies an established conversation for the short code associated with the short message received at step 802, the process proceeds to step 808, where the job monitor and engine 220 returns an identifier of the originator of the established conversation. As discussed above, the conversation parameter table of each conversation includes a sender id, as an identifier of the subscriber of the inter-modal messaging service that established the conversation (typically by sending a first short message). At step 808, this identifier may be returned by the job monitor and engine 220 based on the conversation identified at step 804.

Using this identifier, at step 810, the job monitor and engine 220 forwards the short message received at step 802 back to the originator of the conversation. That is, the job monitor and engine 220 forwards the short message back to the subscriber that originated the short message establishing the conversation which was identified at step 804. The short message may be forwarded back by a return e-mail message, for example. The manner in which the short message is forwarded back may be configured by the subscriber of the inter-modal messaging service, in various embodiments. In certain embodiments, a "reply-to" address of the returned mail message comprises an address of the mobile device 132 that sends the short message received at step 802. Thus, further replies may be maintained, between the parties to the conversation.

It is noted that the job monitor and engine 220 may perform a reverse lookup among the customer database 262, to identify an e-mail associated with the subscriber that originated the short message establishing the conversation identified at step 804. In other embodiments, the identifier returned at step 808 may comprise the e-mail associated with this subscriber, if it is stored in the conversation parameter table as the sender id, for example. In connection with forwarding the short message to the originator of the conversation at step 810, the conversation parameter table for the conversation may be updated. For instance, the expiration time of the conversation may be updated, to extend the time period of the conversation. Further, for billing purposes, the billing controller 270 may log an event at step 810 in connection with forwarding the short message at step 810.

As further illustrated in the example embodiment of FIG. 8, when the job monitor and engine 220 does not identify at step 804 an established conversation for the short code associated with the short message received at step 802, the process proceeds to step 812. At step 812, the job monitor and engine 220 returns an error message to the mobile device that transmitted the short message received at step 802. In various embodiments, the error message may indicate that the short message received at step 802 cannot be forwarded because of an expired conversation, a failure to identify an associated conversation, or any other suitable error message.

It is noted that, at step 804, the job monitor and engine 220 may identify an established conversation, but the conversation may be expired. In one embodiment, if an expired conversation is identified at step 804, the job monitor and engine 220 may decide, at step 806, to proceed to step 808 and maintain the conversation although it is expired. The conversation may be updated in this case with a new expiration time, so long as the parameter table for the conversation was not previously deleted or purged based on its expiration, as discussed above.

In other embodiments, if an expired conversation is identified at step 804, the job monitor and engine 220 may decide, at step 806, to proceed to step 812 where an error message is transmitted as discussed above.

The features of the invention described herein are representative and, in alternative embodiments, certain features and elements may be added or omitted. Additionally, modifications to aspects of the embodiments described herein may be made by those skilled in the art without departing from the spirit and scope of the invention defined in the following claims, the scope of which are to be accorded the broadest interpretation so as to encompass modifications and equivalent structures.

What is claimed is:

1. A method of inter-modal messaging communication, the method comprising:
    prior to distributing multiple portions of an e-mail to both a fax machine and a mobile device capable of performing short message service (SMS) messaging, determining, by a computer, whether a conversation was previously established on the mobile device, wherein the multiple portions comprises a facsimile message portion for distribution to the fax machine as a fax and a short message portion for distribution to the mobile device as a SMS message via the SMS messaging, wherein the determining comprises comparing a destination address of the SMS message with recipient addresses of the email to determine whether the destination address of the SMS message is already associated with an established conversation;
    responsive to determining that a conversation was previously established for the destination address of the SMS message between a sender and a recipient, the computer:
        identifying a short code for the conversation; and
        communicating the SMS message and the short code for the conversation to the mobile device so as to maintain a single unitary thread or channel for the inter-modal messaging communication; and
    responsive to determining that no conversation was previously established for the destination address of the SMS message, the computer:

determining a new short code for the conversation; and
communicating the SMS message and the new short code for the conversation to the mobile device.

2. The method according to claim 1, wherein determining whether a conversation was previously established on the mobile device comprises querying a table containing established conversation parameters, and wherein the established conversation parameters comprise at least one of a sender identifier, a job number, a billing subjob, an item number, a recipient address type, a recipient address, a short code identifier, a start time, or an expiration time.

3. The method according to claim 1, wherein determining a new short code for the conversation comprises determining whether any short code is available, unused, or unassociated for a region where the SMS message is to be distributed.

4. The method according to claim 3, wherein, responsive to no short code is available, unused, or unassociated for a region where the SMS message is to be distributed, determining whether an expired conversation short code is available.

5. The method according to claim 4, wherein determining whether an expired conversation short code is available comprises:
searching a conversation table for an expired conversation that has passed or expired; and
returning an expired short code associated with the expired conversation as a new short code for the conversation.

6. The method according to claim 4, wherein, responsive to no expired conversation short code is available:
searching a table containing established conversation parameters for any conversations that will expire within a predetermined amount of time; and
returning, as the new short code for the conversation, a nearly-expired conversation short code associated with a nearly-expired conversation that is closest to expire among all conversations that that will expire within the predetermined amount of time.

7. The method according to claim 6, wherein, responsive to no nearly-expired conversation short code is found in searching the table:
identifying an oldest conversation short code in the table; and
returning the oldest conversation short code in the table as the new short code for the conversation.

8. A system for inter-modal messaging communication, the system comprising:
a processor;
a non-transitory computer-readable medium; and
instructions stored on the non-transitory computer-readable medium and translatable by the processor for:
prior to distributing multiple portions of an e-mail to both a fax machine and a mobile device capable of performing short message service (SMS) messaging, determining whether a conversation was previously established on the mobile device, wherein the multiple portions comprises a facsimile message portion for distribution to the fax machine as a fax and a short message portion for distribution to the mobile device as a SMS message via the SMS messaging, wherein the determining comprises comparing a destination address of the SMS message with recipient addresses of the email to determine whether the destination address of the SMS message is already associated with an established conversation;
responsive to determining that a conversation was previously established for the destination address of the SMS message between a sender and a recipient:
identifying a short code for the conversation; and
communicating the SMS message and the short code for the conversation to the mobile device so as to maintain a single unitary thread or channel for the inter-modal messaging communication; and
responsive to determining that no conversation was previously established for the destination address of the SMS message:
determining a new short code for the conversation; and
communicating the SMS message and the new short code for the conversation to the mobile device.

9. The system of claim 8, wherein determining whether a conversation was previously established on the mobile device comprises querying a table containing established conversation parameters, and wherein the established conversation parameters comprise at least one of a sender identifier, a job number, a billing subjob, an item number, a recipient address type, a recipient address, a short code identifier, a start time, or an expiration time.

10. The system of claim 8, wherein determining a new short code for the conversation comprises determining whether any short code is available, unused, or unassociated for a region where the SMS message is to be distributed.

11. The system of claim 10, wherein, responsive to no short code is available, unused, or unassociated for a region where the SMS message is to be distributed, determining whether an expired conversation short code is available.

12. The system of claim 11, wherein determining whether an expired conversation short code is available comprises:
searching a conversation table for an expired conversation that has passed or expired; and
returning an expired short code associated with the expired conversation as a new short code for the conversation.

13. The system of claim 11, wherein, responsive to no expired conversation short code is available:
searching a table containing established conversation parameters for any conversations that will expire within a predetermined amount of time; and
returning, as the new short code for the conversation, a nearly-expired conversation short code associated with a nearly-expired conversation that is closest to expire among all conversations that that will expire within the predetermined amount of time.

14. The system of claim 13, wherein, responsive to no nearly-expired conversation short code is found in searching the table:
identifying an oldest conversation short code in the table; and
returning the oldest conversation short code in the table as the new short code for the conversation.

15. A computer program product for inter-modal messaging communication, the computer program product comprising a non-transitory computer-readable medium storing instructions translatable by a processor for:
prior to distributing multiple portions of an e-mail to both a fax machine and a mobile device capable of performing short message service (SMS) messaging, determining whether a conversation was previously established on the mobile device, wherein the multiple portions comprises a facsimile message portion for distribution to the fax machine as a fax and a short message portion for distribution to the mobile device as a SMS message via the SMS messaging, wherein the determining comprises comparing a destination address of the SMS message with recipient addresses of the email to determine whether the destination address of the SMS message is already associated with an established conversation;

responsive to determining that a conversation was previously established for the destination address of the SMS message between a sender and a recipient:
  identifying a short code for the conversation; and
  communicating the SMS message and the short code for the conversation to the mobile device so as to maintain a single unitary thread or channel for the inter-modal messaging communication; and responsive to determining that no conversation was previously established for the destination address of the SMS message:
  determining a new short code for the conversation; and
  communicating the SMS message and the new short code for the conversation to the mobile device.

16. The computer program product of claim 15, wherein determining whether a conversation was previously established on the mobile device comprises querying a table containing established conversation parameters, and wherein the established conversation parameters comprise at least one of a sender identifier, a job number, a billing subjob, an item number, a recipient address type, a recipient address, a short code identifier, a start time, or an expiration time.

17. The computer program product of claim 15, wherein determining a new short code for the conversation comprises determining whether any short code is available, unused, or unassociated for a region where the SMS message is to be distributed.

18. The computer program product of claim 17, wherein, responsive to no short code is available, unused, or unassociated for a region where the SMS message is to be distributed, determining whether an expired conversation short code is available.

19. The computer program product of claim 18, wherein determining whether an expired conversation short code is available comprises:
  searching a conversation table for an expired conversation that has passed or expired; and
  returning an expired short code associated with the expired conversation as a new short code for the conversation; and
  wherein, responsive to no expired conversation short code is available:
    searching a table containing established conversation parameters for any conversations that will expire within a predetermined amount of time; and
    returning, as the new short code for the conversation, a nearly-expired conversation short code associated with a nearly-expired conversation that is closest to expire among all conversations that that will expire within the predetermined amount of time.

20. The computer program product of claim 19, wherein, responsive to no nearly-expired conversation short code is found in searching the table:
  identifying an oldest conversation short code in the table; and
  returning the oldest conversation short code in the table as the new short code for the conversation.

\* \* \* \* \*